Nov. 19, 1963  E. S. HECKATHORN ETAL  3,111,384
SILICA MANUFACTURE
Filed March 23, 1960  3 Sheets-Sheet 1

INVENTOR.
Eugene S. Heckathorn
BY Merwyn D. Riddle
Attorneys

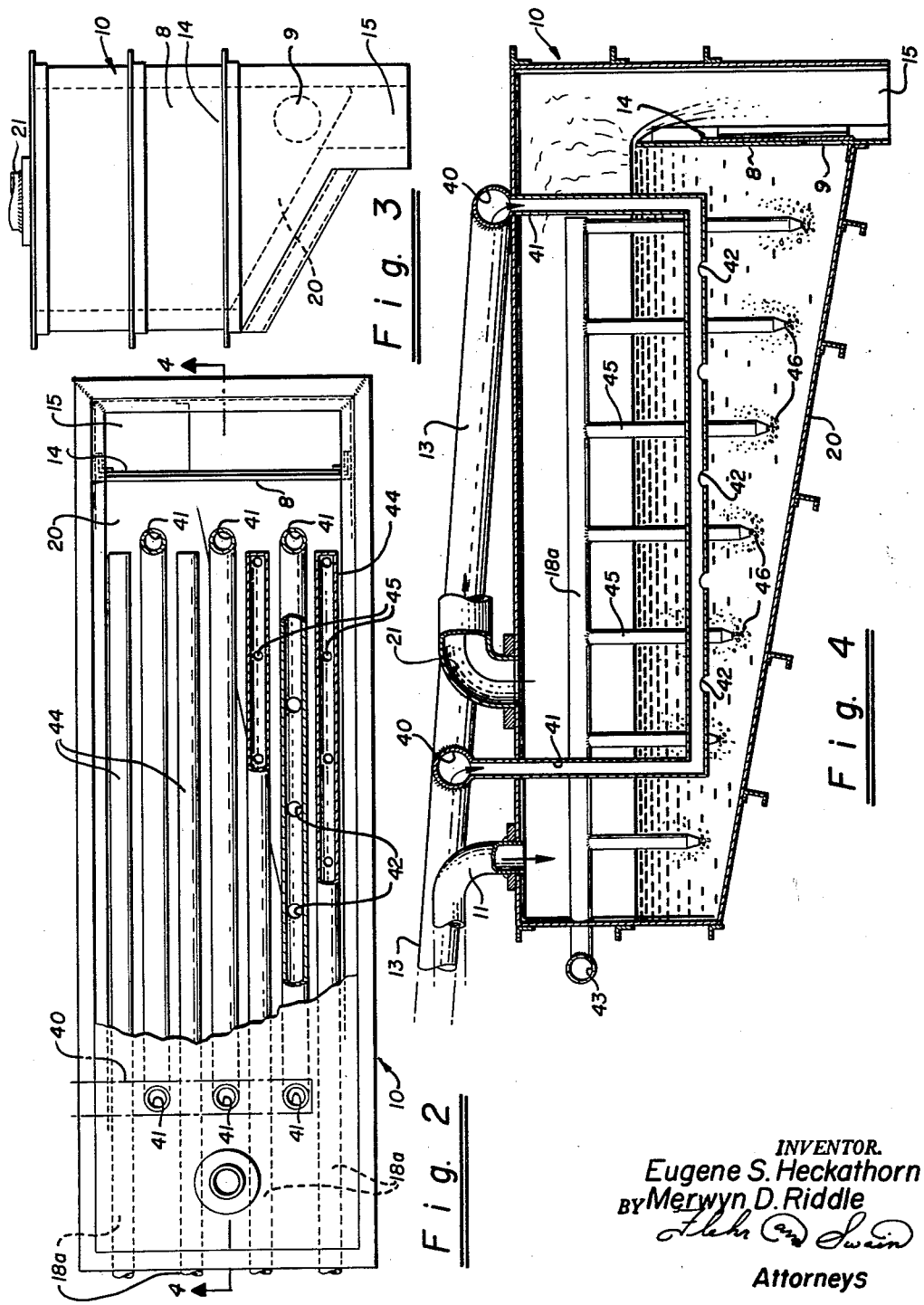

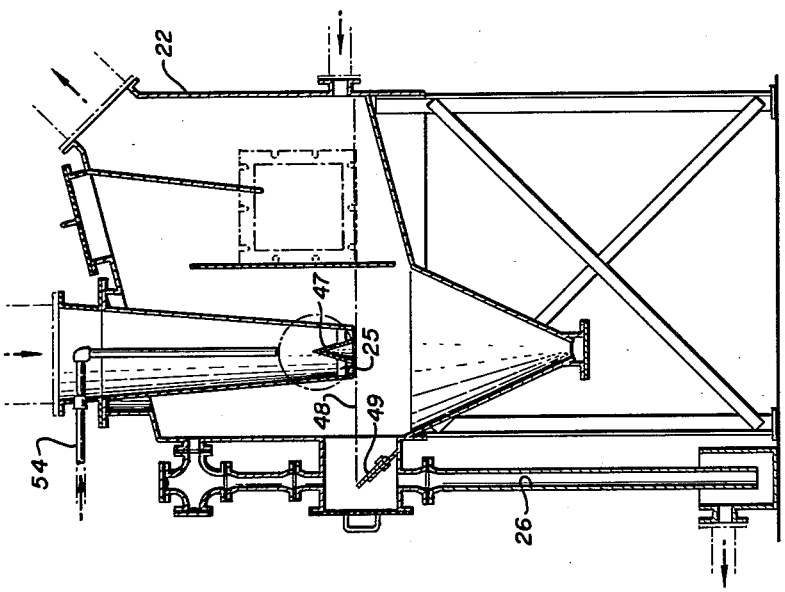
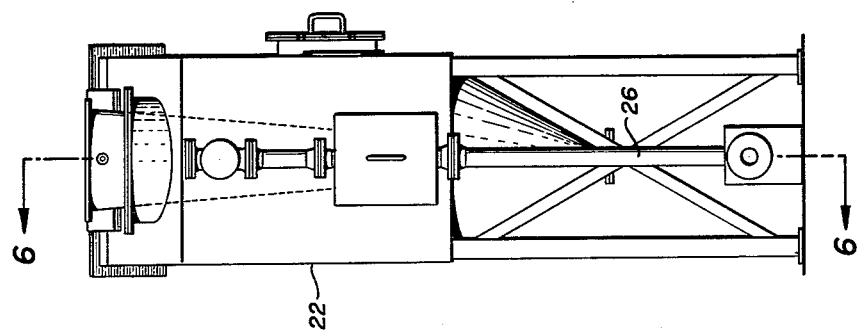
INVENTOR.
Eugene S. Heckathorn
BY Merwyn D. Riddle
Attorneys

3,111,384
SILICA MANUFACTURE
Eugene S. Heckathorn, Orinda, Calif., and Merwyn D. Riddle, Salt Lake City, Utah, assignors to Chemwest Incorporated, a corporation of California
Filed Mar. 23, 1960, Ser. No. 17,115
5 Claims. (Cl. 23—182)

This invention relates generally to a system for the recovery of silica in precipitated form from the acidulation of phosphate rock. A specific application is in the manufacture of a finely divided amorphous silica of relatively high purity and density suitable for insecticidal purposes.

Domestic phosphate rocks are essentially fluorapatite (calcium fluophosphate) admixed with various proportions of other compounds of calcium, chlorine, fluorine, iron, aluminum and silicon. In conventional processes for the acidulation of phosphate rock, such as the sulfuric acid or "wet method," substantial volumes of phosphoric acid are customarily produced. Phosphoric acid produced in this manner normally contains substantial amounts of soluble fluosilicates such as sodium fluosilicate, and fluorine compounds such as hydrogen and calcium fluoride. Various other compounds are also present (e.g., gypsum, aluminum and magnesium sulfates, etc.). The fluorine compounds are generally lost in the processing, for example, in the den gases, digesters, or in specific procedures for defluorination.

The present invention is predicated upon our discovery that the fluorine compounds contained in such phosphoric acid solutions can be recovered, on a continuous basis, and utilized in a simple, relatively economical process for the production of silica precipitates. Our process also yields various fluorine compounds useful in producing compounds such as sodium fluoride, sodium aluminum fluoride (cryolite), and similar compounds.

Broadly stated, our process involves the sulfuric acid digestion of phosphoric acid solutions (obtained by the acidulation of phosphate rock) to evolve silicon tetrafluoride and other fluorine containing gases in a fluosilicate complex, the scrubbing of these gases to yield fluosilicic acid and a silica precipitate, and the ammoniation of the latter to obtain fluorine containing compounds such as ammonium fluoride and a finely divided precipitate of amorphous silica. The silica precipitate can be filtered from the final solution and dried to a desired final moisture content. The dried product possesses a number of desirable characteristics, superior to those obtained by prior processes, which render the dry material ideally suited for various commercial purposes including use as an insecticide.

In general, it is an object of the invention to provide a process for the manufacture of silica in an amorphous or precipitated form, making use of by-product or waste ingredients which have not heretofore been utilizable for such purpose.

A more specific object of the invention is to provide an improved process for the manufacture of a dry precipitated silica product of increased bulk density and enhanced purity.

Another object of the invention is to provide a process of the above character which can be carried out continuously for the continuous production of a relatively pure, dense silica product.

Additional objects and features of the invention will appear from the following description, and from the drawings in which the preferred embodiment of the invention is set forth in detail.

In the drawing:

FIGURE 2 is a view in top plan, with parts broken away, of a stripper chamber or reaction tank useful in carrying out the invention;

FIGURE 3 is a view in end elevation thereof;

FIGURE 4 is a view in vertical section along the line 4—4 of FIGURE 2;

FIGURE 5 is a view in end elevation of a scrubber tower useful in carrying out the invention;

FIGURE 6 is a view in vertical elevation along the line 6—6 of FIGURE 5.

Figure 1:
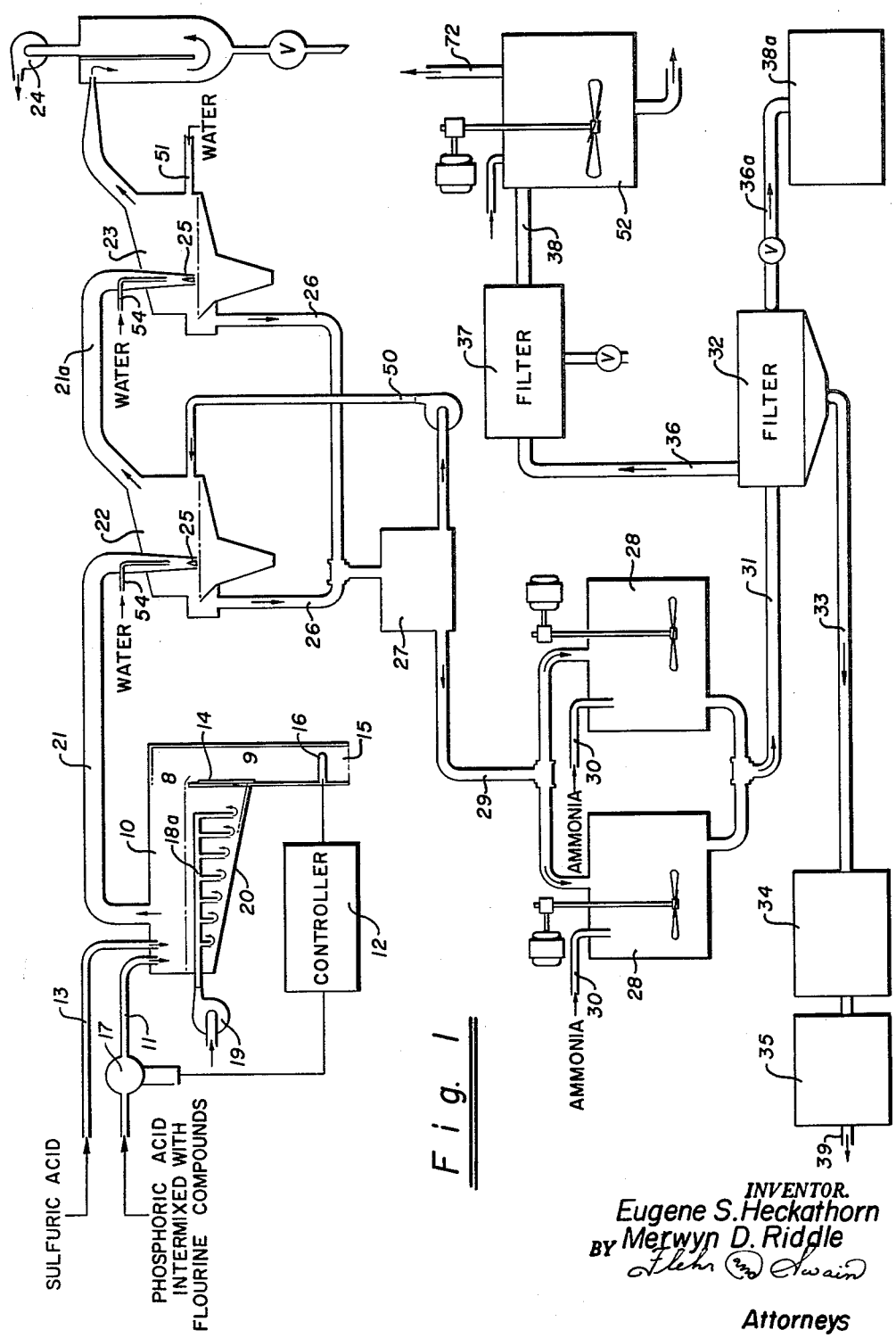
FIGURE 1 is a flow sheet illustrating generally the procedure employed in carrying out the present invention.

Referring to FIGURE 1, our process can be generally carried out as follows: Phosphoric acid derived from the action of sulfuric acid on ground phosphate rock is introduced to a stripper tank 10 through the line 11 at a rate determined by the flow controller 12. Sulfuric acid is simultaneously introduced through the line 13 for intermixing with the phosphoric acid. The intermixed acids are maintained at a desired level within the tank by an adjustable gate 14, and are discharged from the process through the discharge line 15. The flow controller 12, includes a temperature sensing device 16, responsive to reaction temperatures sensed in the discharge line, and a valve 17 positioned in the phosphoric acid line 11, and may be of any known design, suitable for the purpose. Air, preferably heated to reaction temperatures (e.g., 100° to 280° F.), is introduced through the line 18 by means of a positive displacement type blower 19. The air is jetted downwardly against a lower sloping wall 20 of the tank and creates a turbulence or air-sparging of the liquid to prevent stratification of the acids, and to insure a thorough mixing and agitation necessary for the reaction. The gases evolved by the reaction (essentially silicon tetrafluoride mixed with air and other gases in a fluosilicate complex) are withdrawn through the exhaust conduit 21, and through the scrubbers 22 and 23 by means of the exhaust blower 24. In the scrubbers the reaction gases are reacted with water by impingement of the gases against the surface of an aqueous slurry, yielding hydrofluosilicic acid and a silica precipitate (silicic acid). Gas velocities necessary to achieve a desired penetration and intermixing of the reaction gases with the aqueous liquid are obtained by annular nozzles 25, positioned immediately above the liquid level and forming discharge outlets for the conduits 21 and 21A. The slurries containing these compounds are discharged through the lines 26 to a holding tank 27, and from there to ammoniators 28 through the line 29. Ammonia (preferably anhydrous) is introduced through the lines 30, to produce ammonium fluoride and a silica precipitate in a dense amorphous form. The precipitate resulting from this reaction can be filtered at 32 and removed through the line 33 for centrifugation at 34 and drying at 35 to a desired final moisture content. The filtrate containing fluoride compounds can be again filtered at 37 to remove any residual silica precipitate, and discharged for further processing through the line 38, or, it can be discharged through the line 36a for storage in the holding tank 38a. As will appear the dried amorphous silica obtained at 39 is a dense product of very high purity, containing, however, a small amount of natural fluoride that enhances its efficiency when used as an insecticide.

From the foregoing, it will be apparent that successful recovery of the fluorine compounds present in the phosphoric acid, for the reaction in the stripper tank 10, is essential to a successful practice of the invention. Best results have been obtained by use of a stripper chamber or tank of the type illustrated in FIGURES 2 to 4. This tank is substantially rectangular in plan and has a sloping floor or bottom wall 20 which tapers to a discharge outlet 15 in one corner. The liquid level in the stripper tank is maintained by the vertically adjustable gate means 14, which cooperates with a stationary baffle 8 having a drain opening 9 adjacent the bottom wall 20. As will be apparent from the drawings, the gate means and baffle are positioned between the stripper discharge outlet and the inlet conduits 11 and 13 for the reactants. The conduit 11 for introducing phosphoric acid may be of the direct delivery type. Conduit 13 includes manifolds 40 to distribute the sulfuric acid to delivery pipes 41 extending beneath the liquid level, and which are provided with a plurality of distribution openings 42. The air from the blower 19 is distributed through a manifold 43 to a plurality of longitudinally extending pipes 18a, each provided with a number of depending conduits 45 having terminal nozzles 46. This construction insures an intimate contact between the fluorine compounds contained in the phosphoric acid and the sulfuric acid. The air sparge plays a particular role in preventing stratification of the introduced acids and creates a turbulence to assist in the sulfuric acid digestion to evolve silicon tetrafluoride gas and other gases in the fluosilicate complex forwarded to the scrubber towers 22 and 23.

The function of the vertically adjustable gate 14 is to provide a necessary measure of control over the liquid depth in the stripper tank 10 to insure optimum retention of the reactants for the chemical reaction and also to create a cascade of the reactant liquids over the baffle 8 and into the discharge outlet 15. This cascade apparently exposes additional liquid surface which aids in the liberation of evolved gases for efficient discharge through the outlet 21. The gate also cooperates with the drain 9 to permit a constant removal of solid precipitates (e.g., calcium precipitates such as gypsum, magnesium and aluminum sulfates) which tend to form during the reaction.

As previously indicated, phosphoric acid is introduced to the stripper tank 10 at a rate determined by reaction temperatures sensed at the slurry discharge 15. This controlling function (achieved through the controller 12 and valve 17) is based on the exothermic nature of the reaction and insures that the reactants are at all times within a desired range of temperatures for the reaction, i.e., between about 100° to about 280° F. (optimum about 180° to 200° F.). Proper control of reaction temperatures within this range is essential to a uniform evolution of gas within the stripper. However, within the prescribed limits, some fluctuation in temperature has been found to enhance operating efficiencies. Specifically, temperatures in the upper portion of the operating range (e.g., 190° to 280° F.) tend to break up and reslurry the undesired precipitates formed by the reaction, for discharge through the drain 9.

The proportionate rate of feed of phosphoric and sulfuric acid to the reaction tank is also important but is not as reliable for control purposes as the control based on reaction temperatures (due primarily to variation in the water content of the phosphoric acid). In general, we prefer to introduce the sulfuric acid at a constant rate and to vary the proportion of phosphoric acid fed to the process. Under proper operating conditions, we have found that a rate of intermixing of the solutions to achieve reaction temperatures in the desired range, will cause the phosphoric acid to be present in an amount ranging from 4 to 8 times the amount of sulfuric acid (average about 5:1). By way of illustration, if sulfuric acid (95%) is added at a constant rate between about 10 to 40 g.p.m., the controller 12 will cause the phosphoric acid (30%) to be added in an amount ranging from about 50 to 250 g.p.m. Substantial variations are, of course, possible; for example, the phosphoric acid can be added at a constant rate, and the controller 12 employed to vary the rate of sulfuric acid addition. The essential requirement is that the reaction between the sulfuric acid and fluorine components in the stripper proceed at a desired uniform rate, dependent upon maintenance of operating temperatures within the desired range from 100° to 280° F.

The reaction gases from the stripper pass continuously to the scrubbers 22 and 23, where the fluorine compounds are substantially absorbed. In the scrubber apparatus illustrated, the reaction gases are introduced through an annular nozzle 25 formed by a centrally positioned conical baffle 47, and impinged against the liquid surface in the scrubber to obtain a frothing action. This action, coupled with an increased velocity of the entering gases about the cone, produces a deep penetration of the reaction gases into the water bath and a consequent efficient absorption of the fluorine compounds. Absorption also depends on the liquid level in the scrubber, indicated at 48, which is regulated by an adjustable weir 49. Preferably, a water wash is introduced through the lines 54 and is splashed or jetted against the upper surface of the cones 47 to prevent any solid build up in the nozzles 25.

The absorption reaction in the scrubber which is essentially a reaction of silicon tetrafluoride with water, results in the formation of silicic acid and hydrofluosilicic acid. The fluosilicic acid is soluble in water and passes over the weir through the conduit 26 to the holding tank 27. A high mechanical carry-over of the insoluble silicic acid also occurs. When two scrubbers are employed, as illustrated, the liquid in the first scrubber is preferably recycled from the holding tank, as through the line 50 (FIGURE 1). Fresh water is supplied to the second scrubber 23 (line 51) to replace the intermixed silicic and fluosilicic acid being withdrawn for ammoniation through the line 29.

As noted previously, ammoniation is carried out in the agitated tanks 28 by the addition of anhydrous ammonia through the lines 30. The rate of ammonia addition is critical to the process as it determines the character of the amorphous silica precipitate obtained. For the purposes of the present invention, ammonia is added at a rate to obtain a desired pH of the order of 8.4. At this degree of alkalinity, a characteristic precipitate is produced comprising aggregates of tiny white, powdery particles of the order of 0.5 micron with the aggregates ranging in size from about 2 to 16 microns. This precipitate is essentially amorphous silica (silicon tetrahydrate) but also contains a small amount of ammonium fluoride which has been found to enhance the insecticidal efficiency of the end product.

The precipitate resulting from the reaction in the tanks 28 can be filtered to produce a product containing about 80 to 90% water, centrifuged at 34 to reduce the moisture content to about 20 to 50%, and vacuum dried in the presence of heat (e.g., 24 to 48 hours at 150 to 155° F. and 25 to 29 in. Hg) to achieve a final silica product having a moisture content of the order of 2.5% or less. The filtrate removed through the line 36 can be subjected to further processing in the tank 52 to obtain fluorine containing compounds. For example, the filtrate (essentially ammonium fluoride) can be reacted with the sodium hydroxide to yield sodium fluoride, with free ammonia being recovered at 72 for the further use of the process. Processing to obtain cryolite ($3NaFAlF_3$) or similar products can also be carried out at this stage.

By way of specific example, the process has been carried out as follows: A 30% solution of phosphoric acid intermixed with fluorine compounds (e.g., CaF$_2$, Na$_2$SiF$_6$) was introduced to a stripper tank of the type described, at a fluctuating rate determined by the controller 12, averaging about 180 gallons per minute. A 95% solution of sulfuric acid was introduced at a constant rate of about 30 gallons per minute. Air (preheated to approximately 120°) was introduced at a pressure of about 2.0 p.s.i. (gauge). The temperature of the liquid effluent from the stripper outlet 25 was held between 180° and 200° F. and averaged about 190° F. Silicon tetrafluoride fumes and other reaction gases from the stripper were introduced to the scrubbers at an average temperature of about 140° F. Makeup water was introduced to the scrubber 23 at the rate of 6 gallons per minute. The temperature of the gases exhausted from the scrubbers 22 and 23 averaged about 135° F. and 125° F., respectively. The solution from the scrubbers (in the holding tank) had a specific gravity of 1.150 and analyzed at an average of 10.3% fluorine. Upon ammoniation in the manner previously described, this solution produced about 1500 pounds of amorphous silica precipitate for each ton of fluorine. Filtration of this precipitate was accomplished in a Number 12 Sweetland filter, and the precipitate centrifuged to approximately 45% solids prior to drying in hot air.

The resulting dried product had a moisture content of 2.5% and an ignition loss of about 4%. Particle size (aggregates) ranged between 2 and 10 microns (average about 4 microns). The bulk density was about 10 pounds per cubic foot. Its pH was 1.2. The final product had a chemical composition as follows:

| | Percent |
|---|---|
| SiO$_2$ | 93.0 |
| Moisture | 2.5 |
| Ammonium fluosilicate | 1.5 |
| Inert ingredients | 3.0 |
| | 100.0 |

The purity of the product obtained in the above cited example is sufficient to comply with most commercial and insecticidal specifications.

It will be evident that the foregoing process greatly facilitates the commercial manufacture of a silicate precipitate in amorphous form. Less overall time is required for the process and the various steps lend themselves to continuous manufacture. The process is relatively economical with respect to initial capital outlay and maintenance. It is also advantageous in that it makes possible the recovery of fluorine compounds contained in by-products of phosphoric acid from commercial processes for the acidulation of phosphate rock, which heretofore has been lost.

The product of the present invention is particularly useful as a low priced diluent for a wettable insecticide powder. It is also extremely effective by itself as a desiccant type of insecticide, producing a high, rapid rate of mortality in a wide range of arthropods, including insects, mites and crustacea. The mode of action as an insecticide is primarily physical in that the silica absorbs the wax coating cuticle of the arthropods, thus causing loss of body moisture and desiccation of the pest. The small percentage of fluoride present in this product also gives a chemical impact to the body tissues which greatly hastens mortality. In addition, the fluoride in the silica exerts a positive charge on the dust, greatly increasing deposit and adherence to surfaces treated. This is quite important in treating closed spaces, such as sealed attic spaces, etc., where the only mode of application is by spray or dusting from without the space to be treated.

We claim:

1. In a continuous process for the manufacture of amorphous silica in the form of dry divided aggregates, wherein phosphate rock is first reacted with sulfuric acid and the resulting liquid phosphoric acid separated therefrom, the additional steps of reacting the phosphoric acid with additional sulfuric acid, the proportions of liquid phosphoric acid and additional sulfuric acid being such that a desired reaction temperature between about 100° to 280° F. is maintained, sparging the liquid reactants with streams of air to effectively agitate the same and uniformly strip therefrom silicon fluoride and other fluorine containing gases evolved by the reaction, scrubbing the evolved gases by intermixing contacts with a body of water to produce an aqueous solution of fluosilicic acid containing a silica precipitate, contacting the silica-containing aqueous solution with anhydrous ammonia in proportions sufficient to obtain a solution pH of the order of 8.4, whereby a final precipitate is formed comprising aggregates of silica particles, and drying said final precipitate to obtain a dry amorphous silica product.

2. A process as in claim 1 wherein said phosphoric acid is present in an amount ranging from 4 to 8 times the amount of added sulfuric acid.

3. A process as in claim 1 wherein prior to sparging and stripping of the evolved reaction gases with streams of air, the air is preheated to substantially said reaction temperature.

4. A process for the manufacture of dry divided amorphous silica in aggregate form and characterized by increased bulk density and enhanced purity, comprising: continuously intermixing and reacting two liquid solutions to obtain evolution of silicon fluoride gas, the first of said solutions comprising phosphoric acid intermixed with soluble fluosilicates and other fluorine containing compounds obtained by the acidulation of phosphate rock, the second of said solutions comprising sulfuric acid adapted to react with said first solution to produce silicon fluoride gas, said reaction being carried out in the presence of a continuous sparge of air which effectively agitates the liquid reactants and uniformly strips therefrom the silicon fluoride and other fluorine containing gases evolved by the reaction, the rate of intermixing the solutions being such that the first solution is present in an amount ranging from 4 to 8 times that of the second solution to achieve a desired reaction temperature between about 100° to 280° F., scrubbing the gas evolved by means of intermixing contacts with water to thereby produce a third solution containing fluosilicic acid and a silicate precipitate, contacting this third solution with anhydrous ammonia in proportions sufficient to obtain a pH of the order of 8.4, and drying the precipitate thus obtained to achieve a final moisture content of the order of 2.5%.

5. A process for the manufacture of dry divided amorphous silica in aggregate form and characterized by increased bulk density and enhanced purity, comprising: continuously intermixing and reacting two liquid solutions to obtain evolution of silicon fluoride gas, the first of said solutions comprising phosphoric acid intermixed with soluble fluosilicates and other fluorine containing compounds obtained by the acidulation of phosphate rock, the second of said solutions comprising sulfuric acid adapted to react with said first solution to produce silicon fluoride gas, controlling the rate of addition of one of said solutions whereby the first solution is present in an amount ranging from 4 to 8 times that of the second solution to achieve a desired reaction temperature between about 100° to 280° F., said reaction being carried out in the presence of a continuous sparge of air which effectively agitates the liquid reactants and uniformly strips therefrom the silicon fluoride and other fluorine containing gases evolved by the reaction, scrubbing the gas evolved by means of intermixing contacts with water to thereby produce a third solution containing fluosilicic acid and a silicate precipitate, contacting this third solution with anhydrous ammonia in proportions sufficient to obtain a pH of the order of 8.4, filtering the resulting precipitate from the solution, and drying the precipitate thus obtained to produce a final dry silica product.

References Cited in the file of this patent

UNITED STATES PATENTS

| | | |
|---|---|---|
| 1,235,552 | Chappell | Aug. 7, 1917 |
| 1,247,165 | Stahl | Nov. 20, 1917 |
| 1,320,323 | Drucker et al. | Oct. 28, 1919 |
| 1,617,708 | Gehauf et al. | Feb. 15, 1927 |
| 1,854,731 | Beran | Apr. 19, 1932 |
| 1,972,196 | Larison | Sept. 4, 1934 |
| 1,973,211 | Keikham | Sept. 11, 1934 |
| 2,636,806 | Winter | Apr. 28, 1953 |
| 2,785,953 | Fitch | Mar. 19, 1957 |
| 2,856,268 | Young | Oct. 14, 1958 |
| 2,865,711 | Gloss et al. | Dec. 23, 1958 |
| 2,883,266 | Hodges et al. | Apr. 21, 1959 |
| 2,929,690 | Bennett et al. | Mar. 22, 1960 |